United States Patent [19]

Chow et al.

[11] Patent Number: 5,623,513
[45] Date of Patent: Apr. 22, 1997

[54] MITIGATING CLIPPING AND QUANTIZATION EFFECTS IN DIGITAL TRANSMISSION SYSTEMS

[75] Inventors: Jacky S. Chow, Mountain View; John A. C. Bingham, Palo Alto; Mark B. Flowers, Sunnyvale; John M. Cioffi, Cupertino, all of Calif.

[73] Assignee: Amati Communications Corporation, San Jose, Calif.

[21] Appl. No.: 165,509

[22] Filed: Dec. 13, 1993

[51] Int. Cl.$^6$ .............................. H04L 5/16; H04B 15/00
[52] U.S. Cl. .......................... 375/219; 375/285; 375/296
[58] Field of Search ................................... 375/254, 285, 375/296, 222, 220, 346, 219; 379/3, 410, 411; 370/32.1, 32; 455/43

[56] References Cited

U.S. PATENT DOCUMENTS

| | | | |
|---|---|---|---|
| 4,268,727 | 5/1981 | Agrawal et al. | 379/411 |
| 4,270,026 | 5/1981 | Shenoi et al. | 375/240 |
| 4,272,648 | 6/1981 | Agrawal et al. | 375/250 |
| 4,377,858 | 3/1983 | Treiber | 370/24 |
| 4,644,108 | 2/1987 | Crouse et al. | 379/406 |
| 4,746,902 | 5/1988 | Tol et al. | 340/347 |
| 5,095,497 | 3/1992 | Aman et al. | 375/285 |
| 5,166,924 | 11/1992 | Moose | 370/32.1 |
| 5,177,734 | 1/1993 | Cummiskey et al. | 370/32.1 |
| 5,247,512 | 9/1993 | Sugawa et al. | 370/32.1 |
| 5,315,585 | 5/1994 | Iizuka et al. | 370/32.1 |
| 5,317,596 | 5/1994 | Ho et al. | 379/410 |
| 5,396,519 | 3/1995 | Betts et al. | 375/296 |
| 5,507,033 | 4/1996 | Dolan | 455/43 |

OTHER PUBLICATIONS

Patent Abstracts of Japan, vol. 15, No. 135, JP 3-016438, Jan. 24, 1991.
M. Ho, et al., "High-speed Full-Duplex Echo Cancellation for Discrete Multitone Modulation", 1993 International Conference on Communications, May 1993, pp. 772–776.
J.C. Bingham, "Multicarrier Modulation for Data Transmission: An Idea Whose Time Has Come", IEEE Communications Magazine, vol. 28, No. 5, May 1990, pp. 5–14.
S. Fleming, et al., "ADSL: The On-Ramp to the Information Highway", Telephony, Jul. 1993, pp. 20–26.

*Primary Examiner*—Tesfaldet Bocure
*Attorney, Agent, or Firm*—Hickman Beyer & Weaver

[57] ABSTRACT

A transmission system includes transmit and receive paths coupled via a hybrid circuit to a bidirectional transmission path. The transmit path includes a digital-to-analog converter (DAC) having a given range and precision. The transmit path signal is limited and truncated to this range and precision before the DAC. In one arrangement including an echo canceller coupled between the transmit and receive paths, a difference of the transmit path signal before and after limiting and truncation is used to produce an estimated echo response which is subtracted from the receive path signal. In another arrangement, all of the inputs to the echo canceller are derived from the transmit path after the limiting and truncation. Instead, or in addition, the amplitudes of transmit path signal samples can be shaped in conjunction with the limiting. The system can in particular be an ADSL transmission system using multicarrier modulation. In such a system the amplitudes of transmit path signal samples can be scaled to reduce clipping, with an indication of the scaling being transmitted to a remote receiver.

34 Claims, 4 Drawing Sheets

MITIGATING CLIPPING AND QUANTIZATION EFFECTS IN DIGITAL TRANSMISSION SYSTEMS

This invention relates to digital transmission systems, and is particularly concerned with mitigating the effects of clipping and/or quantization in such systems. Although the invention includes aspects applicable to transmission systems using any form of modulation, both with and without echo cancellation, it is of particular advantage in transmission systems using multicarrier modulation and adaptive echo cancellation.

RELATED APPLICATIONS

U.S. patent application Ser. No. 07/984,938 filed Dec. 1, 1992 in the names of M. Ho and J. M. Cioffi, entitled "Method And Apparatus For Echo Cancellation With Discrete Multicarrier Modulation", discloses a particular form of echo canceller for use in bidirectional transmission systems using multicarrier modulation.

U.S. patent application Ser. No. 08/107,200 filed Aug. 17, 1993 by John M. Cioffi et al., entitled "Multicarrier Modulation Transmission System With Variable Delay", discloses a transmission system using multicarrier modulation in which different data signals are provided with different transmission delays and reliabilities.

The entire disclosure of each of these applications is hereby incorporated herein by reference.

BACKGROUND OF THE INVENTION

It is well known to provide adaptive echo cancellation arrangements in systems in which signals are transmitted in both directions via a two-wire line to which a transmitter and a receiver are both coupled via a hybrid circuit. It is desirable for the echo canceller in such arrangements to cancel substantially completely components of signals transmitted by the transmitter which would otherwise be coupled to the receiver due to imperfect balancing in the hybrid circuit.

Conventional echo cancellation arrangements do not compensate for non-linear distortions of the signals to be cancelled. Non-linear distortions arise, for example, from conversions between analog and digital signals as a result of quantization and clipping.

In the above respect, Tol et al. U.S. Pat. No. 4,746,902, issued May 24, 1988 and entitled "Arrangement For Compensating For Non-Linear Distortion In An Input Signal To Be Digitized And An Echo Cancelling System Comprising Such An Arrangement", describes an echo cancellation arrangement in which the digital output of an analog-to-digital converter, which is supplied with a received signal via a hybrid circuit, is summed with compensation values stored in a memory which is addressed by the output of a quantizing circuit. The quantizing circuit is driven by a linear estimate of the echo signal or by the received signal in analog or digital form. Such an arrangement does not address non-linear distortions due to clipping, and requires increasing memory sizes for increasingly accurate compensation and/or smaller quantization steps.

Transmission systems using multicarrier modulation are becoming increasingly important. The principles of multicarrier modulation are described for example in "Multicarrier Modulation For Data Transmission: An Idea Whose Time Has Come" by John A. C. Bingham, IEEE Communications Magazine, Vol. 28, No. 5, pages 5–14, May 1990.

The term "multicarrier modulation" is used to include modulation in various different ways, for example using transforms such as an FFT (Fast Fourier Transform), DFT (Discrete Fourier Transform), DCT (Discrete Cosine Transform), or a wavelet transform. The term "discrete multitone" (DMT) is used to refer to multicarrier modulation which, as is desirable, is effected using a Discrete Fourier Transform.

An example of a transmission system using multicarrier modulation is an ADSL (asymmetric digital subscriber line) system. For example, an article by S. Fleming et al. entitled "ADSL: The on-ramp to the information highway", Telephony, Jul. 12, 1993, pages 20–26 describes an ADSL system in which four asymmetric 1.5 Mb/s channels are provided for transmission in a downstream direction from a telephone CO (central office) to a subscriber, in addition to various data channels and POTS (plain ordinary telephone service) carried symmetrically (i.e. bidirectionally), via a two-wire telephone subscriber line.

The patent application by John M. Cioffi et al. referred to above also describes an ADSL transmission system using multicarrier modulation.

It has also been proposed to provide an echo cancellation arrangement in an ADSL system or in other transmission systems using multicarrier modulation. In this respect, the patent application in the names of M. Ho and J. M. Cioffi referred to above describes a particular form of echo cancellation arrangement, as does an article by M. Ho et al. entitled "High-Speed Full-Duplex Echo Cancellation For Discrete Multitone Modulation", 1993 International Conference on Communications, pages 772–776, May 1993.

Transmission systems using multicarrier modulation typically have a transmitted signal with a higher peak-to-average ratio than single carrier transmission systems, and thus generally require digital-to-analog converters (DACs) and analog-to-digital converters (ADCs) with higher precision, i.e. more bits. With any given DAC and ADC, the signal level must be adjusted to make use of the full conversion range. An excessive signal level results in clipping noise that is generally impulsive. Conversely, signal levels that avoid all clipping result in a waste of the ADC/DAC precision most of the time, the quantization process then giving rise to a significant amount of quantization noise. A tradeoff must therefore be made between the amount of clipping and the amount of quantization noise.

The above comments also apply, of course, to other transmission systems in which clipping and quantization occur for example due to the use of DACs and ADCs.

As indicated above, the clipping noise and quantization noise are not cancellable using conventional echo cancellation arrangements, and thus detract from the performance of the transmission system. Clipping noise and quantization noise also adversely affect the performance of the far end receiver, whether or not echo cancellation is present. An object of this invention, therefore, is to provide a method of mitigating clipping and/or quantization effects in a digital transmission system, and to provide an improved terminal for such a transmission system.

SUMMARY OF THE INVENTION

According to one aspect, this invention provides a method of mitigating clipping and/or quantization effects in a transmission system in which a transmit signal on a transmit signal path is coupled to, and a receive signal on a receive signal path is derived from, a bidirectional transmission path via a hybrid circuit, the transmit signal path including an operation on the transmit signal which in the absence of the method would introduce clipping and/or quantization of the transmit signal, the method comprising the steps of: processing the transmit signal in a predetermined manner prior to said operation to reduce or eliminate clipping and/or quantization of the transmit signal in said operation; and compensating for said processing in a predetermined manner.

Thus the invention recognizes that effects of clipping and quantization of the transmit signal, for example in a digital-to-analog converter, can be mitigated in a manner which involves introducing the clipping and quantization separately before such an operation, the digital-to-analog conversion or other operation then not introducing any further clipping or quantization.

Preferably said operation comprises a digital signal processing operation on the transmit signal, within a predetermined digital range and/or with a predetermined digital signal precision, and the step of processing the transmit signal prior to said operation comprises limiting the transmit signal to said range and/or truncating the transmit signal to said precision.

In one embodiment of the invention, the system includes echo cancellation between the transmit and receive signal paths and the step of compensating for said processing comprises the steps of: producing an error signal from a difference between the transmit signal before said processing and the transmit signal after said processing; producing an estimated echo response from the error signal; and subtracting the estimated echo response from the receive signal. In another embodiment the system includes echo cancellation between the transmit and receive signal paths and the step of compensating for said processing comprises the step of performing the echo cancellation only in response to the transmit signal after said processing. In the latter case the method may include the step of demodulating the transmit signal after said processing to produce a demodulated signal for performing the echo cancellation.

In further embodiments of the invention, which may be combined with either of the above embodiments, said operation comprises a digital signal processing operation on the transmit signal, within a predetermined digital range, and the step of processing the transmit signal prior to said operation comprises limiting the transmit signal to said range or scaling the transmit signal in accordance with said range. The step of compensating for said processing then comprises the step of shaping the transmit signal in conjunction with said limiting, or transmitting an indication of said scaling for complementary scaling at a receiver to which the transmit signal is transmitted.

Viewed alternatively, this invention provides a method of compensating for nonlinear distortion of a transmit signal, due to clipping of said signal to a predetermined range and/or quantization of said signal to a predetermined precision, in a transmission system in which a transmit path for the transmit signal and a receive path for a receive signal are coupled to a bidirectional transmission path via a hybrid circuit, and an echo canceller is provided between the transmit path and the receive path. In one aspect the method comprises the steps of: limiting the transmit signal to the predetermined range and/or truncating the transmit signal to the predetermined precision; producing an error signal from a difference between the transmit signal before said limiting and/or truncating and the transmit signal after said limiting and/or truncating; producing an estimated echo response from the error signal; and subtracting the estimated echo response from the receive signal on the receive path. In another aspect the method comprises the steps of: limiting the transmit signal to the predetermined range and/or truncating the transmit signal to the predetermined precision; and supplying the transmit signal to the echo canceller only after said limiting and/or truncating.

A further aspect of the invention provides a method of mitigating clipping effects in a transmission system in which a transmit path for a transmit signal and a receive path for a receive signal are coupled to a bidirectional transmission path via a hybrid circuit, the transmit signal comprising samples which are subject to clipping to a predetermined range, the method comprising the steps of: limiting amplitudes of samples of the transmit signal to the predetermined range; and in conjunction with each sample whose amplitude is limited to the predetermined range, modifying the amplitude of at least one neighbouring sample in a predetermined manner dependent upon an amount of said amplitude limiting. An echo canceller can be provided between the transmit path and the receive path, in which case this method can further comprise the step of supplying the transmit signal to the echo canceller only after said limiting.

Another further aspect of the invention provides a method of mitigating clipping and/or quantization effects in a transmission system in which a transmit path for a transmit signal and a receive path for a receive signal are coupled to a bidirectional transmission path via a hybrid circuit, the transmit signal comprising samples which are subject to clipping to a predetermined range and/or quantization to a predetermined precision within said predetermined range, the method comprising the steps of: scaling amplitudes of the transmit signal in accordance with said range; and transmitting an indication of said scaling for complementary scaling at a receiver to which the transmit signal is transmitted. Thus if one or more samples of a multicarrier modulation symbol are subject to clipping, then the amplitudes of all of the samples of the symbol are equally scaled at the transmitter, with a complementary rescaling of the amplitudes of all of the samples of the symbol at the receiver.

Again in this case an echo canceller can be provided between the transmit path and the receive path, in which case the latter method can further comprise the step of supplying the transmit signal to the echo canceller only after said scaling.

This invention also provides a transmission system terminal comprising a transmit path for a transmit signal, a receive path for a receive signal, a hybrid circuit for coupling the transmit and receive paths to a bidirectional transmission path, and an echo canceller coupled between the transmit and receive paths, wherein: the transmit path includes a function for operating on the transmit signal within a predetermined digital range and/or with a predetermined digital signal precision, and a limiting and/or truncation unit preceding said function for limiting the transmit signal to said range and/or quantizing the digital signal to said precision; and each input signal to the echo canceller from the transmit path is derived from the transmit path after the limiting and/or truncation unit.

The terminal may include a demodulator responsive to a modulated transmit signal on the transmit path after the limiting and/or truncation unit for supplying a demodulated signal to the echo canceller.

The invention additionally provides a transmission system terminal comprising a transmit path for a transmit signal, a receive path for a receive signal, a hybrid circuit for coupling the transmit and receive paths to a bidirectional transmission path, and an echo canceller coupled between the transmit and receive paths, wherein: the transmit path includes a function for operating on the transmit signal within a predetermined digital range and/or with a predetermined digital signal precision, and a limiting and/or truncation unit preceding said function for limiting the transmit signal to said range and/or quantizing the digital signal to said precision: the terminal includes a unit responsive to differences between the transmit signal before and after the limiting and/or truncation unit for producing an estimated echo response from said differences; and the receive path includes a unit for subtracting the estimated echo response from the receive signal.

In the case of either terminal as recited above, the function for operating on the transmit signal within a predetermined digital range and/or with a predetermined digital signal precision may comprise a digital-to-analog converter. The limiting and/or truncation unit can be arranged to limit transmit signal samples to said range and, in conjunction with each sample whose amplitude is limited to said range, to modify the amplitude of at least one neighbouring sample in a predetermined manner dependent upon an amount of the amplitude limiting.

The invention further provides a transmission system terminal comprising a transmit path for a transmit signal, a receive path for a receive signal, and a hybrid circuit for coupling the transmit and receive paths to a bidirectional transmission path, wherein the transmit path includes a function for operating on samples of the transmit signal within a predetermined digital range, and a unit preceding said function arranged to limit the amplitude of transmit signal samples to said range and, in conjunction with each sample whose amplitude is limited to said range, to modify the amplitude of at least one neighbouring sample in a predetermined manner dependent upon an amount of the amplitude limiting. Alternatively, the unit preceding said function can be arranged to scale the amplitude of transmit signal samples in accordance with said range and to provide as a part of the transmit signal an indication of said scaling for complementary scaling at a receiver. In either case, advantageously the terminal includes an echo canceller coupled between the transmit and receive paths, each input signal to the echo canceller from the transmit path being derived from the transmit path after said unit.

A particular aspect of the invention provides a terminal for a transmission system using multicarrier modulation, comprising: a transmit path including an Inverse Fourier Transform (IFFT) for transforming transmit signal samples from a frequency domain to a time domain, and a digital-to-analog converter (DAC) for converting transmit signal samples in the time domain to analog signals for transmission, the DAC having a predetermined digital signal range and/or digital precision which is less than that of the IFFT; a receive path including an analog-to-digital converter for converting a receive signal into digital signal samples and a Fast Fourier Transform (FED for transforming the receive signal samples from the time domain to the frequency domain, the receive path further including a subtracter for subtracting an echo signal from the receive signal; a hybrid circuit coupled to the transmit path and the receive path for coupling transmit signals to and receive signals from a bidirectional transmission path; and an echo canceller having at least one input coupled to the transmit path and an output providing said echo signal; wherein the transmit path further includes a limiting and/or truncation unit arranged to limit and/or truncate signal samples from the IFFT to the digital signal range and/or digital precision of the DAC, and wherein each input of the echo canceller from the transmit path is derived from the transmit path after the limiting and/or truncation unit.

In one form of such a terminal, the echo canceller comprises a frequency-domain echo canceller and the subtracter in the receive path comprises a subtraction unit arranged to subtract a frequency-domain echo signal output of the frequency-domain echo canceller from an output of the FFT, the terminal including a further FFT arranged to transform limited and/or truncated signal samples from the output of the limiting and/or truncation unit into the frequency domain to constitute an input signal to the frequency-domain echo canceller.

Another particular aspect of the invention provides a terminal for a transmission system using multicarrier modulation, comprising: a transmit path including an Inverse Fast Fourier Transform (IFFT) for transforming transmit signal samples from a frequency domain to a time domain, a digital-to-analog converter (DAC) for converting transmit signal samples in the time domain to analog signals for transmission, the DAC having a predetermined digital signal range and/or digital precision which is less than that of the IFFT, and a limiting and/or truncation unit arranged to limit and/or truncate signal samples from the IFFT to the digital signal range and/or digital precision of the DAC; a receive path including an analog-to-digital converter (ADC) for converting a receive signal into digital signal samples and a Fast Fourier Transform (FFT) for transforming the receive signal samples from the time domain to the frequency domain, the receive path further including at least one subtracter for subtracting an echo signal and an estimated echo response from the receive signal; a hybrid circuit coupled to the transmit path and the receive path for coupling transmit signals to and receive signals from a bidirectional transmission path; an echo canceller having at least one input coupled to the transmit path and an output providing said echo signal; and an echo response estimation unit responsive to differences between the transmit signal samples before and after the limiting and/or truncation unit for producing said estimated echo response from said differences.

BRIEF DESCRIPTION OF THE DRAWINGS

The invention will be further understood from the following description with reference to the accompanying drawings, in which the same references are used in different figures to denote similar components and in which.

Figure 1:
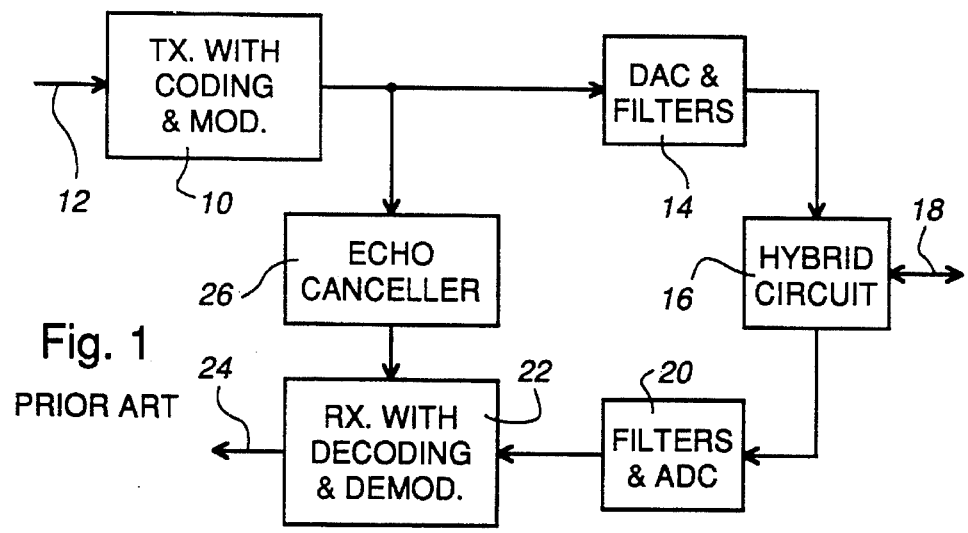
FIG. 1 illustrates a block diagram of a known bidirectional digital transmission system including an echo cancellation arrangement.

Although in the drawings various blocks are shown as discrete units, it should be appreciated that the functions represented by these units may in practice be carried out in a variety of different manners. In particular, it is observed that a number of these functions may most conveniently be carried out by one or more digital signal processors. This is especially the case when the transmission system is a multicarrier modulation transmission system using discrete multitone modulation (DMT), as described further below.

DETAILED DESCRIPTION

Referring to FIG. 1, a known digital transmission system includes a transmitter (TX.) 10, which is assumed to include any coding and modulation functions, which is supplied via a line 12 with an input signal for transmission, and whose output is coupled via a DAC (digital-to-analog converter) and filter unit 14 and a hybrid circuit 16 to a bidirectional transmission path 18, for example a two-wire telecommunications line. Signals received via the line 18 are coupled via the hybrid circuit 16 and a filter and ADC (analog-to-digital converter) unit 20 to a receiver (RX.) 22, which is assumed to include any decoding and demodulation functions and which produces a received output signal on a line 24.

An echo canceller 26 is shown as having an input connected to the output of the transmitter 10 and an output coupled to the receiver 22. In the receiver 22, the output of the echo canceller 26 is subtracted from the signal received via the unit 20 in order to cancel components of the transmitted signal which may be present. As is known in the art, the echo canceller 26 can have coefficients which are adapted over time for optimum cancellation. In addition, although for simplicity this is not shown in the drawings, the echo canceller 26 can have a plurality of inputs connected to the transmit path for example both before and after the modulation function in the transmitter 10, and a plurality of outputs connected to the receive path for example both before and after the demodulation function in the receiver 22. Thus the echo canceller 26 can operate in either or both of the unmodulated and modulated transmit path signals.

As explained in the introduction, the digital range and digital precision limitations imposed by the conversion between digital and analog signals in the units 14 and 20 gives rise to clipping noise and quantization noise which are non-linear distortions and are not cancelled by the echo canceller 26. Quantization and clipping noise are of increasing significance with increasing precision of the digital signals being transmitted, for example as in transmission systems using multicarrier modulation.

Figure 2:
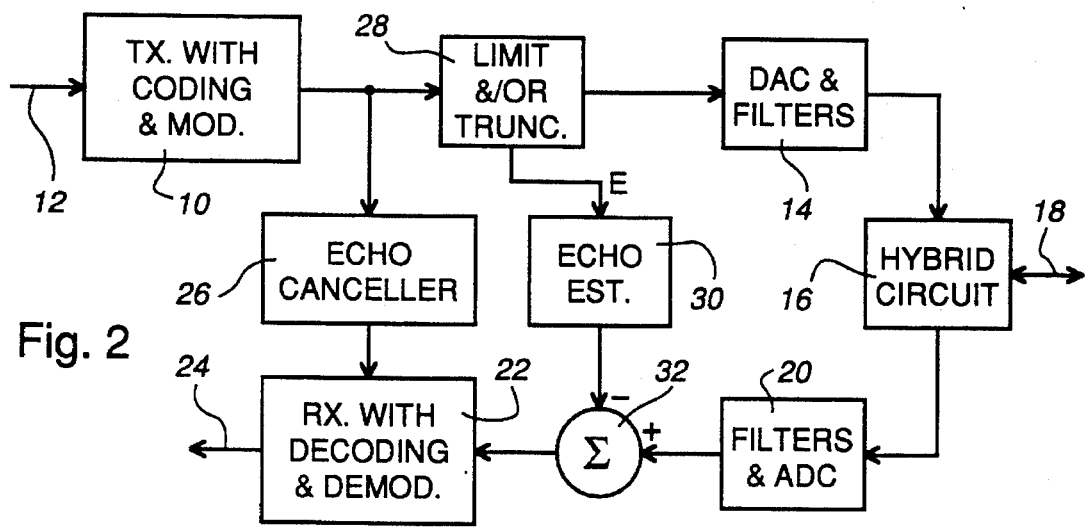
FIGS. 2 to 6 illustrate block diagrams of bidirectional digital transmission systems in which clipping and/or quantization effects are mitigated in accordance with embodiments of this invention.

FIG. 2 illustrates a block diagram of a digital transmission system in accordance with an embodiment of this invention. As illustrated in FIG. 2, the system includes the same components as the known system of FIG. 1, with the addition of a signal limiter and/or truncation unit 28, an echo estimation unit 30, and a subtraction unit 32. The echo estimation unit 30 provides the echo impulse response of an error signal E supplied to its input, and acts as a transversal filter in accordance with coefficients which are established initially in response to a pseudo-random bit sequence being supplied via the line 12 to the transmitter 10, this being carried out in a manner known for setting coefficients within the echo canceller 26.

The unit 28, which is shown separately but can be an integral part of the DAC in the unit 14, serves to limit and/or truncate each sample of the original digital signal to be transmitted, supplied to it from the transmitter 10, to supply the resulting limited and/or truncated digital signal sample to the DAC in the unit 14, and to produce as the error signal E the difference between the original digital signal sample and the limited and/or truncated signal sample. The echo estimation unit 30 performs a normal convolution between this error signal E and the echo impulse to produce a resulting signal which is subtracted by the subtraction unit 32 from the output signal of the filter and ADC unit 20.

The truncation step in the unit 28 corresponds to the quantization of the signal to the precision, or number of bits, of the DAC in the unit 14. For example, the signal coding and modulation performed in the transmitter 10 may be implemented by digital signal processing with a digital precision of 24 bits, and the DAC may have a resolution or precision of only 10 to 16 bits. There is thus a quantization from a 24-bit signal to a 10- to 16-bit signal, the information contained in the least significant bit positions being lost. This loss of information constitutes the truncation of the signal.

The limiting step in the unit 28 corresponds to a clipping of larger magnitudes of the signal supplied to the DAC, and thus relates to the most significant signal bit positions. If the encoded and modulated signal from the transmitter 10 has a magnitude which exceeds the range of the DAC, then the limiting in the unit 28 limits or clips the signal to the maximum of this range.

It should be appreciated that in the prior art these limiting and truncation steps have been inherently carried out in the operation of the DAC. This embodiment of the invention differs from the prior art in that the limiting and/or truncation steps are carried out in the unit 28 and the error signal E is produced accordingly and supplied via the echo estimation unit 30 to be subtracted from the received signal by the subtraction unit 32 thereby to compensate for clipping and/or quantization noise (due to limiting and/or truncation, respectively, in the DAC).

Either or both of the limiting and truncation steps can be carried out by the unit 28. In other words, the error signal E can represent the difference between the original digital signal from the transmitter 10 and either the limited signal without truncation, or the truncated signal without limiting, or the limited and truncated signal. Although the third of these alternatives is the most desirable, the digital signal processing computational requirements can be very high in cases where the error signal E takes into account the truncation process. Accordingly, this embodiment of the invention is of most significance in eliminating clipping noise, in which case the unit 28 includes only the limiting step, and the error signal E represents the difference for each sample between the output of the transmitter 10 and the limited signal supplied to the DAC.

As an alternative to the arrangement of the system as shown in FIG. 2, the subtraction unit 32 can be replaced by an analog subtracter between the hybrid circuit 16 and the unit 20, this subtracter being supplied with the output of the echo estimation unit 30 via a digital-to-analog converter (not shown).

Figure 3:
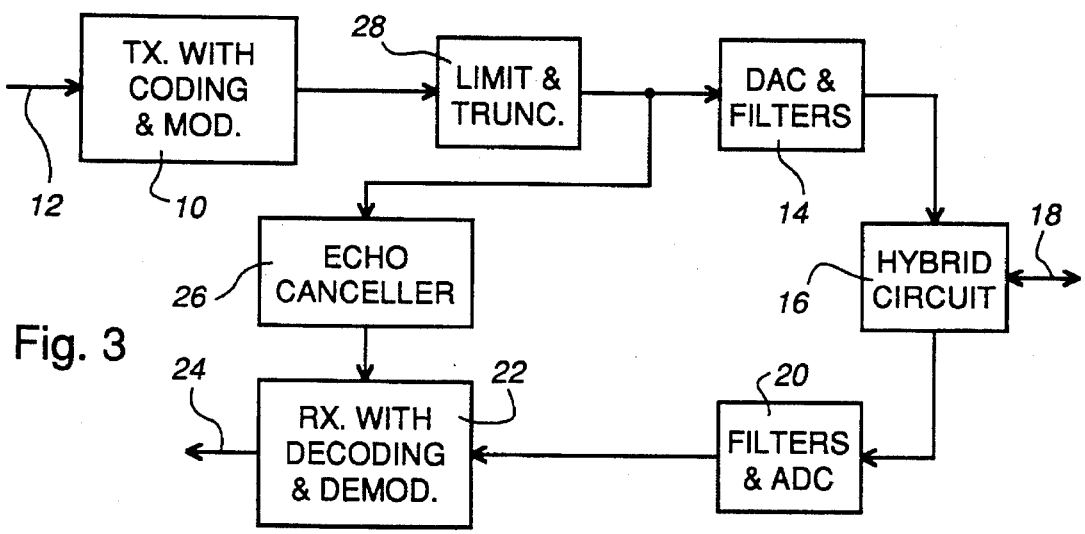

FIG. 3 illustrates a block diagram of a transmission system in accordance with another embodiment of this invention, in which the unit 28 performs both limiting and truncation as discussed above, and the units 30 and 32 of FIG. 2 are omitted. In the system of FIG. 3, the input to the echo canceller 26 is taken from the output side of the unit 28, not directly from the output of the transmitter 10 as in the prior art of FIG. 1.

It should be appreciated that, in the system of FIG. 3, where the echo canceller 26 receives a plurality of input signals the arrangement becomes more complicated than is immediately apparent from the block diagram as illustrated. For example, if the echo canceller 26 has two inputs, one for the signal before modulation and another for the modulated signal, then in the system of FIG. 3 the modulated signal input to the echo canceller is taken from the output of the unit 28 as illustrated. The signal before modulation, i.e. an unmodulated signal, is also derived from the output of the unit 28 after the limiting and truncation steps. Thus in this case the output signal of the unit 28 is demodulated (requiring an additional demodulation function) and the resulting modulated, limited, truncated, and demodulated signal is supplied to the unmodulated signal input of the echo canceller. An example of this is further described below with reference to FIG. 7.

Thus in the system of FIG. 3, every signal which is used as an input to the echo canceller 26 is derived, as illustrated, from the limited and truncated signal at the output of the unit 28, and not from anywhere else in the system.

In the system of FIG. 3, the signal which is supplied to the DAC in the unit 14, having been limited and truncated in the unit 28 to take into account the characteristics of the DAC, is not subject to any further quantization noise or clipping noise within the DAC. This same signal is supplied to the echo canceller 26, which accordingly operates on the same signal which is supplied to the DAC and which is not subject to further nonlinear distortion due to quantization or clipping. Thus in this system the effects of quantization and clipping are eliminated completely as far as the echo cancellation is concerned.

Although in the system of FIG. 3 the unit 28 performs both limiting and truncation to match the range and precision of the DAC in the unit 14, obviously either of these functions could be performed alone if so desired. In implementing the unit 28 using digital signal processing techniques, the computational requirements for the limiting and truncation operations are very small. As discussed above and described further below, if the echo canceller 26 requires a demodulated signal input, then additional computation is required for demodulating the signal from the output of the unit 28. The relative computational requirements for such a demodulation function in the system of FIG. 3 and for the unit 30 in the system of FIG. 2 may determine a preference for one system over the other in particular circumstances.

Obviously the system of FIG. 3 could be modified by supplying to the echo canceller 26 both the error signal E, produced as in the system of FIG. 2, and the original signal supplied from the output of the transmitter to the input of the unit 28, and computing the output signal of the unit 28 within the echo canceller 26 from these signals. This is functionally the same as taking the output signal directly from the unit 28 to the echo canceller, but involves more computation and accordingly is less desirable.

Figure 4:
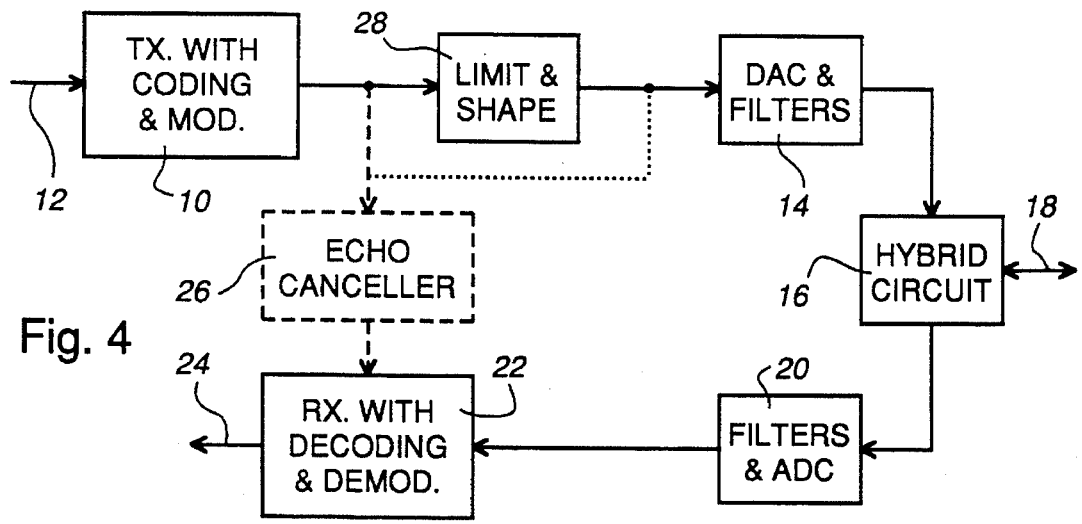
Figure 5:
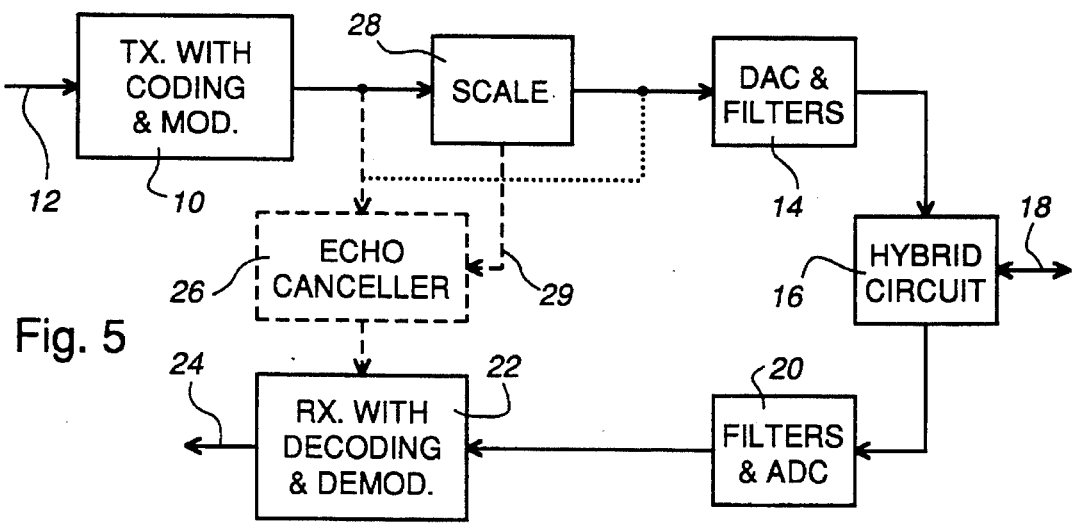

FIGS. 4 and 5 illustrate systems which are similar to that of FIG. 1 except for the provision of the unit 28. In the systems of FIGS. 4 and 5, the echo canceller is not essential and can be omitted. For this reason, the echo canceller 26 and its connections are shown in dashed lines in FIGS. 4 and 5. An alternative, and advantageous, connection of the input of the echo canceller 26 is shown by a dotted line in FIGS. 4 and 5; as can be appreciated, this corresponds to the connection of the echo canceller 26 to the output side of the unit 28 as described above with reference to FIG. 3.

In the system of FIG. 4, the unit 28 provides both a limiting and shaping of the signal samples supplied to the DAC in the unit 14. The limiting function is the same as for the unit 28 in the systems of FIGS. 2 and 3, in that any signal sample whose magnitude exceeds the range of the DAC is limited to the maximum magnitude of this range, so that there is no further limiting or clipping within the DAC. In addition, whenever any sample is limited in this manner, the unit 28 in the system of FIG. 3 also modifies the magnitude of one or more neighbouring samples (i.e. samples preceding and/or following the limited sample), thereby to change the spectral content of the clipping noise. The frequency spectrum of clipping noise is otherwise relatively flat, and is shaped by this modification.

This magnitude modification, or shaping, is carried out in the unit 28 by adding to or subtracting from each neighbouring sample to be modified an amount which is related to the clipping error. i.e. the difference between the limited sample and its original value before limiting, in a predetermined manner. By way of example, it may be desired to shape the clipping error by the pulse response [−0.5, 1, −0.5]. In this case, whenever the unit 28 reduces a positive value of a sample by an amount X in carrying out the limiting function (i.e. the unshaped clipping error has the negative value −X), it also adds an amount X/2 to the samples immediately preceding and following the limited sample. Similarly, if the unit 28 increases a negative value of a sample by an amount X (i.e. the unshaped clipping error has the positive value X), it also subtracts an amount X/2 from the immediately preceding and following samples.

The shaping function in the unit 28 thus reshapes the clipping noise, thereby facilitating operation of a far-end receiver coupled to the line 18. The optimal shaping will depend upon the particular characteristics of the system, but any desired shaping can be earned out by the unit 28 in a similar manner.

In the system of FIG. 5, the unit 28 provides an amplitude scaling of the signal samples supplied to the DAC in the unit 14. The system represented in FIG. 5 is assumed to be a multicarrier transmission system, in which each multicarrier symbol comprises a plurality of subchannels or carriers at different frequencies each carrying one or more bits of the transmitted symbol. For example, the system may use DMT (discrete multitone) modulation of a large number of, e.g. 256, subchannels. As described further below, one or more bits of each transmitted symbol are reserved and used to transmit a scaling indication in accordance with which the unit scales the amplitude of all signal samples in the transmitted symbol, in order to avoid clipping or to reduce it to a lower and more tolerable level. The receiver of the transmitted symbol rescales the amplitudes in accordance with this scaling indication in the symbol.

More particularly and by way of example, the unit 28 in the system of FIG. 5 determines whether each multicarrier symbol is to be scaled down in energy by 0 (i.e. the signal amplitudes are unchanged), 1, 2, or 3 dB in order to reduce or avoid clipping, inserts a two-bit indication of this energy scaling on all or part of a subchannel of the system which is otherwise unused, and effects a corresponding scaling of all of the signal amplitudes of this multicarrier symbol. The two-bit energy scaling indication is transmitted as quadrature phase information which is detected in a phase detector of the receiver at the far end of the line 18. In accordance with the detected indication, the receiver performs a complementary rescaling of all of the signal amplitudes of the multicarrier symbol. The default situation is a symbol which is not subject to clipping, corresponding to an energy scaling of 0 dB. A symbol which would otherwise be heavily clipped is scaled down in energy by 3 dB, so that clipping is avoided or reduced to a more tolerable level.

It will be appreciated that this scaling by the unit 28, while reducing clipping noise, results in an increased quantization noise. However, as clipping noise generally has a more detrimental effect than quantization noise, there is a reduction in the combined adverse effects of clipping and quantization. It should also be appreciated that a similar arrangement can if desired be used conversely or in addition to increase the energy of multicarrier symbols which are not subject to clipping thereby to reduce quantization noise. Thus the scaling by the unit 28 in the system of FIG. 5 can be performed to provide an optimum trade-off between the effects of clipping and quantization noise. Although not shown in FIG. 5, the unit 28 in the system of FIG. 5 can also perform a limiting function if necessary on the scaled multicarrier symbol signal amplitudes in the same manner as described above with reference to FIGS. 2 to 4.

As already explained above, the echo canceller 26 is shown in dashed lines in FIGS. 4 and 5 to indicate that it need not necessarily be present. If it is provided, then its input can be connected to the output side of the transmitter 10 as shown by dashed lines, or to the output side of the unit 28 as shown by dotted lines, in FIGS. 4 and 5. In the former case in the system of FIG. 5, a control line 29 (shown dashed, and not required in the latter case) is also provided from the scaling unit 28 to the echo canceller 26, via which control line the echo canceller is controlled to effect a corresponding amplitude scaling of the echo response.

More generally, it should be appreciated that the scaling function of the unit 28 in the multicarrier system of FIG. 5, and/or the limiting and shaping function of the unit 28 in the (single carrier or multicarrier) system of FIG. 4, and/or the limiting and/or truncating function of the unit 28 in the (single career or multicarrier) system of FIG. 2 or 3, can be used alone or in combination as desired to suit particular circumstances. In each case, the functions of the unit 28 are readily carried out using digital signal processing techniques.

The following table summarizes the various combinations of the systems of FIGS. 2 to 5 which may advantageously be provided in accordance with embodiments of the invention, indicating whether or not the echo canceller (EC) 26 is present and whether or not the system can use single carrier (SC) modulation (all of the combinations can use multicarrier modulation):

| FIG. 2 | FIG. 3 | FIG. 4 | FIG. 5 | EC? | SC? |
|--------|--------|--------|--------|-----|-----|
| x      |        |        |        | Yes | Yes |
| x      |        | x      |        | Yes | Yes |
| x      |        | x      | x      | Yes | No  |
| x      |        |        | x      | Yes | No  |
|        | x      |        |        | Yes | Yes |
|        | x      | x      |        | Yes | Yes |
|        | x      | x      | x      | Yes | No  |
|        | x      |        | x      | Yes | No  |
|        |        | x      |        | Optional | Yes |
|        |        | x      | x      | Optional | No  |
|        |        |        | x      | Optional | No  |

Figure 6:
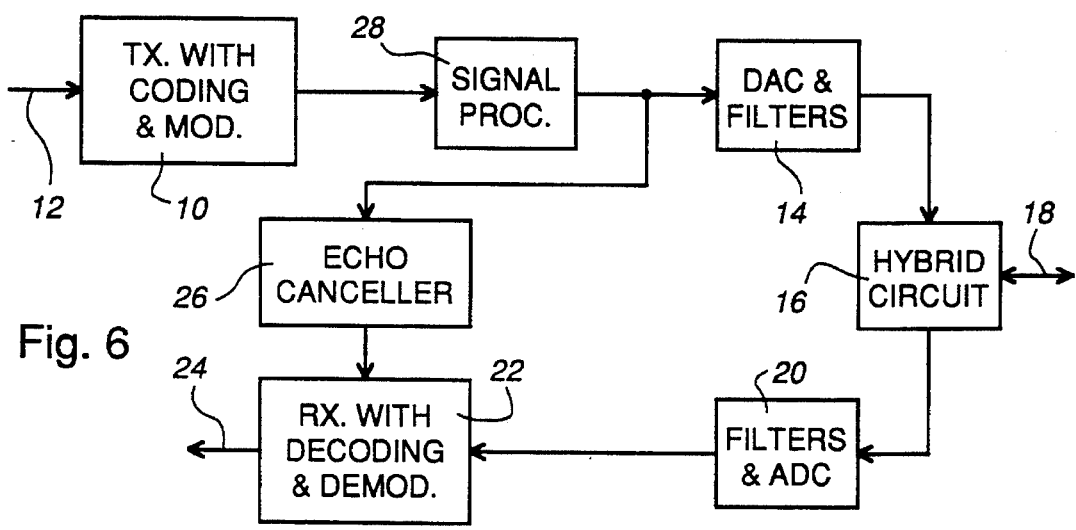

Thus for example FIG. 6 illustrates a system which combines the features of the systems of FIGS. 3 and 4. In the system of FIG. 6, the unit 28 is represented as a signal processing unit and carries out the limiting function of the unit 28 in the systems of FIGS. 2 to 4, the shaping function of the unit 28 in the system of FIG. 4, and the truncation function of the unit 28 in the system of FIG. 2 or 3, all as described above. In addition, the input to the echo canceller 26 is derived from the output of the unit 28 as in the system of FIG. 3 as also described above. Thus in this case the reshaping of the clipping noise by the unit 28 is also effective for the echo canceller 26, while at the same time the echo canceller is supplied with the same signal, not subject to further clipping or quantization noise, as is supplied to the DAC in the unit 14, as described above with reference to FIG. 3.

Although as described above the invention is applicable to any transmission system which may be subject to clipping and/or quantization noise, it is of particular advantage when used in transmission systems using echo cancellation and multicarrier modulation, such as discrete multitone modulation (DMT), an increasingly important example of which is an ADSL (asymmetric digital subscriber line) transmission system.

In an ADSL transmission system, much more information is transmitted in a downstream direction, from a central office (CO) terminal to a remote or subscriber terminal, than is transmitted in the opposite, or upstream, direction from the remote terminal to the CO terminal. This is conveniently achieved by making the sampling rate of the CO terminal transmitter (and the remote terminal receiver) an integral multiple, k times, the sampling rate of the remote terminal transmitter (and the CO terminal receiver). The different sampling rates for the two directions of transmission are accommodated in the echo cancellation process by interpolation functions in the remote terminal and decimation functions in the CO terminal, as described further below with reference to FIGS. 7 and 8 respectively.

Figure 7:
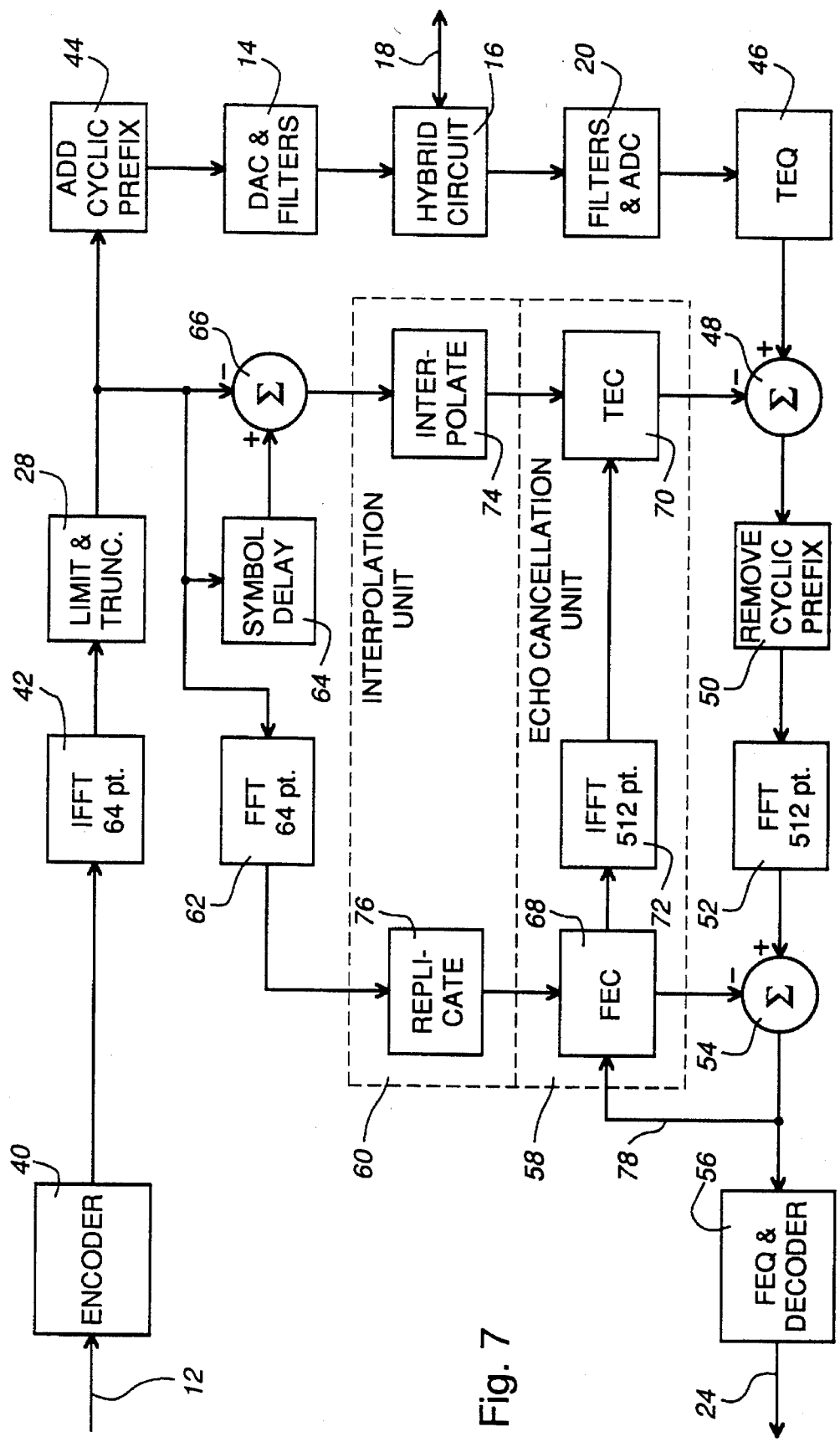
FIGS. 7 and 8 illustrate functional block diagrams of transceivers of an ADSL transmission system in accordance with embodiments of this invention.
Figure 8:
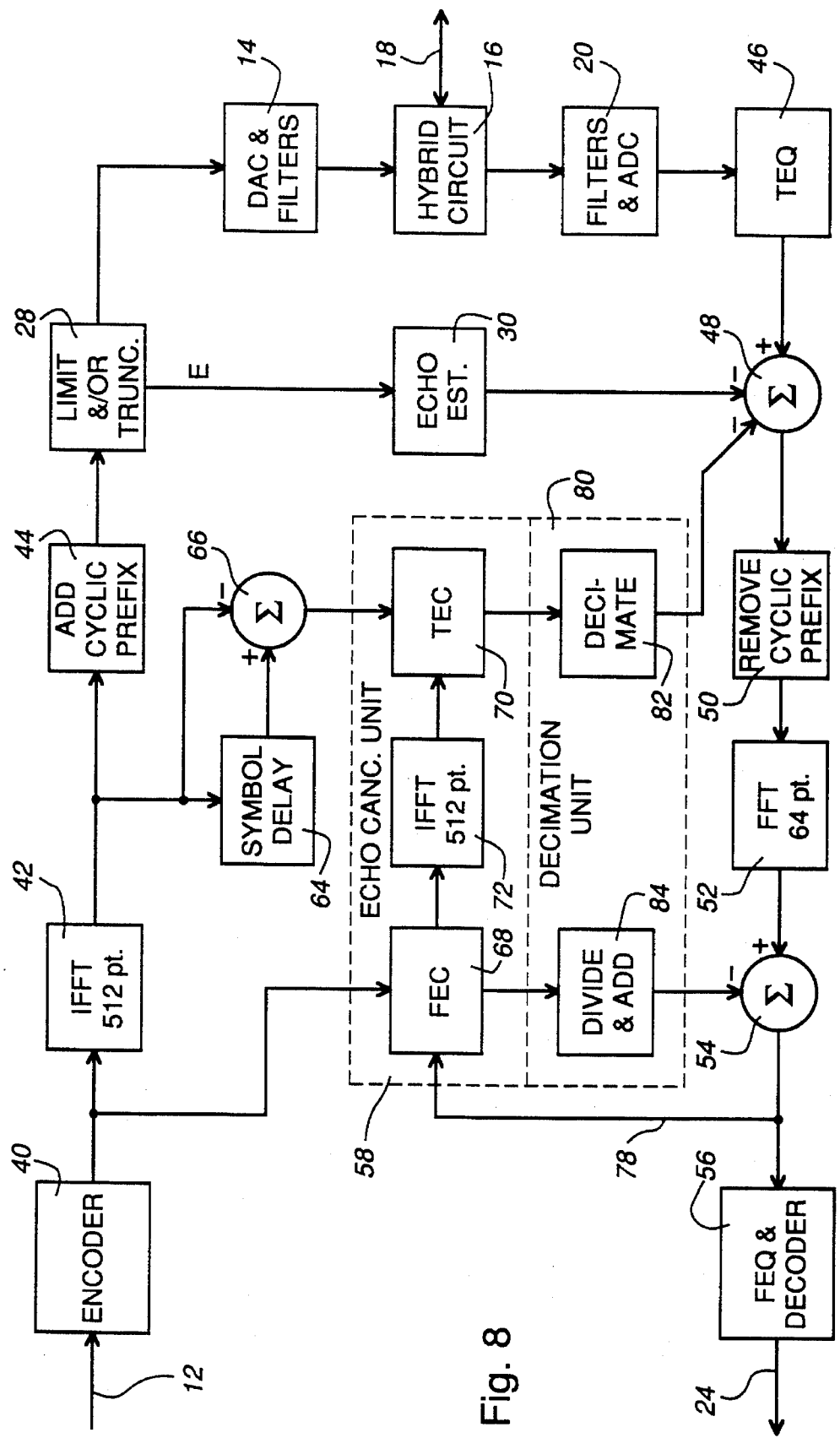

FIG. 7 illustrates one example of the system of FIG. 3 applied to the remote terminal of an ADSL transmission system using DMT modulation, and FIG. 8 illustrates one example of the system of FIG. 2 applied to the CO terminal of an ADSL transmission system using DMT modulation. In each case it is assumed that k=8, the systems using Fast Fourier Transforms (FFTs) and Inverse-FFTs (IFFTs) of 64 points for the slower upstream information sampling rate and of 512 points for the faster downstream information sampling rate, with the echo cancellations being performed at the faster sampling rate.

In FIGS. 7 and 8 the same references as in FIGS. 2 and 3 are used where applicable. Except for the hybrid circuit 16 and the filters in the units 14 and 20, substantially all of the functions represented in each of FIGS. 7 and 8 are advantageously carried out using one or more digital signal processors.

Referring to FIG. 7, illustrating a remote terminal, an upstream information signal on the line 12 is encoded by an encoder 40 and transformed into the time domain (i.e. modulated) by a 64 point IFFT 42. The resulting signal samples are limited and truncated by the unit 28 as described above with reference to FIG. 3. A cyclic prefix is added by a unit 44 to the resulting limited and truncated signal samples from the unit 28, and the resulting signal is supplied via the DAC and filter unit 14 and the hybrid circuit 16 to the two-wire subscriber line 18.

A signal received via the line 18 is coupled via the hybrid circuit 16 to the filter and ADC unit 20. The output signal of the unit 20 is coupled in sequence via a time-domain equalizer (TEQ) unit 46, a subtraction unit 48, a unit 50 which removes the cyclic prefix, a 512-point FFT 52 in which the signal is transformed into the frequency domain (i.e. demodulated), another subtraction unit 54, and a frequency-domain equalizer (FEQ) and decoder unit 56 to produce a downstream information signal on the line 24.

Although details of the units 40 to 56 are not significant to this invention, it is observed that the cyclic prefix added by the unit 44 consists of a repetition of information from the end of a data block in order to provide a guard space to eliminate interference from one transmitted data symbol to the next. The TEQ unit 46 comprises a finite impulse response digital filter that limits such interference to less than the length of the cyclic prefix, so that removal of the prefix by the unit 50 eliminates the interference. The FEQ in the unit 56 operates individually on each subchannel or carrier of the system and adaptively adjusts for the attenuation and delay of each carrier. The encoder 40 and IFFT 42 can implement trellis coded modulation, and the FFT 52 and decoder in the unit 56 can implement trellis coded demodulation, of the respective signals.

The remaining units illustrated in FIG. 7 constitute the echo canceller 26, and comprise an echo cancellation unit 58, an interpolation unit 60, a 64-point FFT 62, and a delay compensation unit comprising a delay unit 64 and a subtraction unit 66. The echo cancellation unit 58 comprises a frequency-domain echo canceller (FEC) 68, a time-domain echo canceller (TEC) 70, and a 512-point IFFT 72. The interpolation unit 60 comprises an interpolation unit 74 for time-domain signals and a replication unit 76 for frequency-domain signals.

The limited and truncated output signal of the unit 28 is transformed into the frequency domain by the FFT 62 and replicated by the factor k in the frequency domain by the unit 76 to produce an input signal to the FEC 68. The output signal of the FEC 68 is subtracted from the output signal of the FFT 52 by the subtraction unit 54 to provide echo cancellation in the frequency domain. The output of the subtraction unit 54 is fed back via a path 78 to the FEC 68 to provide for adaptive adjustment of its coefficients, and these are transformed into the time domain by the IFFT 72 to provide for adaptive adjustment of the coefficients of the TEC 70. This adaptive adjustment is carried out at a relatively slow rate, for example every 10 transmitted data symbols, in order to reduce the computational requirements for the IFFT 72.

The limited and truncated output signal of the unit 28 is also supplied to the subtraction unit 66 and the delay unit 64, which provides a delay of one symbol. The subtraction unit 66 subtracts the current symbol from the previous symbol, delayed by the delay unit 64, to produce a delay compensated time-domain signal at the output of the subtraction unit 66. This signal is interpolated by the factor k in the time domain to produce an input signal to the TEC 70, whose output signal is subtracted from the output signal of the TEQ 46 by the subtraction unit 48 to provide echo cancellation in the time domain.

For a further understanding of the operation of the echo canceller, reference is directed to U.S. patent application Ser. No. 07/984,938 already referred to.

The CO terminal can be arranged in a similar manner to the remote terminal, except that the interpolation unit 60, on the input side of the echo canceller as described above, is omitted and instead a decimation unit is provided on the output side of the echo canceller as described below with reference to FIG. 8. For the faster sampling rate of the information transmitted in the downstream direction, the demodulating function, corresponding to the 64-point FFT 62 in FIG. 7, would be implemented by a 512-point FFT with a consequent significant increase in computational requirements. As an alternative, which may involve a smaller increase in computational requirements, the system of FIG. 2 can be applied for the CO terminal, as further described below with reference to FIG. 8.

Referring to FIG. 8, in the CO terminal the interpolation unit 60 of FIG. 7 is omitted, and instead a decimation unit 80 is provided. The unit 80 has a decimation factor of k and comprises a decimator unit 82, via which the time-domain signal output of the TEC 70 is coupled to a subtraction input of the subtraction unit 48 for carrying out echo cancellation in the time domain, and a divide and add unit 84, which performs an equivalent function in the frequency domain and couples the signal output of the FEC 68 to the subtraction input of the subtraction unit 54 for carrying out echo cancellation in the frequency domain. As in the system of FIG. 2, the unit 28 limits and/or truncates the signal samples to be transmitted, and produces the error signal E which is supplied to the echo estimation unit 30 whose output is coupled to another subtraction input of the subtraction unit 48 (corresponding to the unit 32 in FIG. 2). The TEC 70 is supplied with the time-domain signal from the output of the IFFT 42 via the delay compensation unit comprising the delay unit 64 and the subtraction unit 66, and the FEC 68 is supplied with the frequency-domain signal from the output of the encoder 40, the additional FFT 62 of FIG. 7 being omitted. The other units shown in FIG. 8 are as described above with reference to FIG. 7, except that, in view of the different information sample rate, in FIG. 8 the IFFT 42 is a 512-point IFFT and the FFT 52 is a 64-point FFT.

Although particular embodiments of the invention have been described in detail, it should be appreciated that numerous modifications, variations, and adaptations may be made thereto without departing from the scope of this invention as defined in the claims.

What is claimed is:

1. A method of mitigating clipping effects in a transmission system in which a transmit signal on a transmit signal path is coupled to, and a receive signal on a receive signal path is derived from, a bidirectional transmission path via a hybrid circuit, the transmit signal path including a digital-to-analog conversion operation on the transmit signal which in the absence of the method would introduce clipping of the transmit signal, and echo cancellation is performed between the transmit path and the receive path, the method comprising the steps of:

altering, prior to said digital-to-analog conversion operation, signal characteristics of the transmit signal to reduce or eliminate clipping of the transmit signal by said digital-to-analog conversion operation; and compensating the transmit signal for said altering; and performing the echo cancellation in accordance with at least the transmit signal after said altering.

2. A method as claimed in claim 1 wherein said altering of the transmit signal prior to said digital-to-analog conversion operation comprises limiting the transmit signal to a predetermined range associated with said digital-to-analog conversion operation.

3. A method as claimed in claim 2 wherein said performing of the echo cancellation between the transmit and receive signal paths comprises:

producing an error signal from a difference between the transmit signal before said altering and the transmit signal after said altering;

producing an estimated echo response from the error signal; and subtracting the estimated echo response from the receive signal.

4. A method as claimed in claim 3 wherein said altering comprises limiting the transmit signal to said range, and said compensating further comprises shaping the transmit signal in conjunction with said limiting.

5. A method as claimed in claim 3 wherein said altering comprises scaling amplitudes of the transmit signal in accordance with said range, and said compensating further comprises transmitting an indication of said scaling for complementary scaling at a receiver to which the transmit signal is transmitted.

6. A method as claimed in claim 2 wherein said performing of the echo cancellation between the transmit and receive signal paths uses only the transmit signal after said altering.

7. A method as claimed in claim 6 wherein said method further includes: demodulating the transmit signal after said altering to produce a signal for performing the echo cancellation.

8. A method ms claimed in claim 6 wherein said altering includes limiting the transmit signal to said range, and said compensating further comprises shaping the transmit signal in conjunction with said limiting.

9. A method as claimed in claim 6 wherein said altering includes scaling amplitudes of the transmit signal in accordance with said range, and said compensating further comprises transmitting an indication of said scaling for complementary scaling at a receiver to which the transmit signal is transmitted.

10. A method as claimed in claim 1 wherein said altering comprises limiting the transmit signal to a predetermined range, and said compensating comprises shaping the transmit signal in conjunction with said limiting.

11. A method as claimed in claim 1 wherein said operation comprises a digital signal processing operation on the transmit signal within a predetermined digital range, the step of processing the transmit signal prior to said operation includes scaling amplitudes of the transmit signal in accordance with said range, and the step of compensating for said processing comprises transmitting an indication of said scaling for complementary scaling at a receiver to which the transmit signal is transmitted.

12. A method of compensating for non-linear distortion of a transmit signal, due to clipping of said signal to a predetermined range of a digital-to-analog converter, in a transmission system in which a transmit path for the transmit signal and a receive path for a receive signal are coupled to a bidirectional transmission path via a hybrid circuit, the digital-to-analog converter being within the transmit path, the method comprising the steps of:

limiting the transmit signal to the predetermined range prior to the digital-to-analog converter;

producing an error signal from a difference between the transmit signal before said limiting and the transmit signal after said limiting;

producing an estimated echo response from the error signal; and subtracting the estimated echo response from the receive signal on the receive path.

13. A method of compensating for non-linear distortion of a transmit signal, due to clipping of said signal to a predetermined range of a digital-to-analog converter, in a transmission system in which a transmit path for the transmit signal and a receive path for a receive signal are coupled to a bidirectional transmission path via a hybrid circuit, the digital-to-analog converter being within the transmit path, and an echo canceller is provided between the transmit path and the receive path, the method comprising the steps of:

limiting the transmit signal to the predetermined range prior to the digital-to-analog converter; and supplying the transmit signal to the echo canceller after said limiting.

14. A method as claimed in claim 13 and including the step of demodulating the transmit signal after said limiting to supply a signal to the echo canceller.

15. A method of mitigating clipping effects in a transmission system in which a transmit path for a transmit signal and a receive path for a receive signal are coupled to a bidirectional transmission path via a hybrid circuit, the transmit signal comprising samples which are subject to clipping to a predetermined range by a digital-to-analog converter within the transmit path, the method comprising the steps of:

limiting amplitudes of samples of the transmit signal to the predetermined range prior to the digital-to-analog converter; an echo canceler is provided between the transmit path and the receive path, and supplying the transmit signal to the echo canceler after said limiting; and for the samples whose amplitude has been limited, increasing or decreasing the amplitude of at least one neighboring sample in a predetermined manner dependent upon an amount of said amplitude limiting.

16. A method of mitigating clipping in a transmission system in which a transmit path for a transmit signal and a receive path for a receive signal are coupled to a bidirectional transmission path via a hybrid circuit, the transmit signal comprising samples which are subject to clipping to a predetermined range by a digital-to-analog converter within the transmit path, the method comprising the steps of:

scaling amplitudes of the transmit signal in accordance with the predetermined range prior to the digital-to-analog converter; an echo canceler is provided between the transmit path and the receive path, and supplying the transmit signal to the echo canceler after said scaling; and transmitting an indication of said scaling for complementary scaling at a receiver to which the transmit signal is transmitted.

17. A transmission system terminal comprising a transmit path for a transmit signal, a receive path for a receive signal, a hybrid circuit for coupling the transmit and receive paths to a bidirectional transmission path, and an echo canceller coupled between the transmit and receive paths, wherein:

the transmit path includes a digital-to-analog converter for operating on the transmit signal within a predetermined digital range, and a limiting unit preceding said digital-to-analog converter for limiting the transmit signal to said range; and an input signal to the echo canceller from the transmit path is derived from the transmit path after bring limited by the limiting unit.

18. A terminal as claimed in claim 17 and including a demodulator responsive to a modulated transmit signal on the transmit path after the limiting for supplying a signal to the echo canceller.

19. A terminal as claimed in claim 17 wherein the limiting unit is arranged to limit transmit signal samples to said range and, for the samples whose amplitude has been limited to said range, to modify the amplitude of at least one neighbouring sample in a predetermined manner dependent upon an amount of the amplitude limiting.

20. A transmission system terminal comprising a transmit path for a transmit signal, a receive path for a receive signal, a hybrid circuit for coupling the transmit and receive paths to a bidirectional transmission path, and an echo canceller coupled between the transmit and receive paths, wherein:

the transmit path includes a digital-to-analog converter for operating on the transmit signal within a predetermined digital range, and a limiting unit preceding said digital-to-analog converter for limiting the amplitude of the transmit signal to said range;

the terminal includes a unit responsive to differences between the transmit signal before and after the limiting unit for producing an estimated echo response from said differences; and the receive path includes a unit for subtracting the estimated echo response from the receive signal.

21. A terminal as claimed in claim 20 wherein the function for operating on the transmit signal within a predetermined digital range comprises a digital-to-analog converter.

22. A terminal as claimed in claim 20 wherein the limiting unit is arranged to limit transmit signal samples to said range and, for the samples whose amplitude has been limited to said range, to modify the amplitude of at least one neighboring sample in a predetermined manner dependent upon an amount of the amplitude limiting.

23. A transmission system terminal comprising a transmit path for a transmit signal, a receive path for a receive signal, and a hybrid circuit for coupling the transmit and receive paths to a bidirectional transmission path, wherein the transmit path includes a digital-to-analog converter for operating on samples of the transmit signal within a predetermined digital range, and a unit preceding said digital-to-analog converter arranged to limit the amplitude of transmit signal samples to said range and, for the samples whose amplitude has been limited to said range, to increase or decrease the amplitude of at least one neighboring sample in a predetermined manner dependent upon an amount of the amplitude limiting, and an echo canceler coupled between the transmit and the receive paths, wherein each input signal to the echo canceler from the transmit path is derived from the transmit path after said unit arranged to limit the amplitude of the transmit signal sample to said range.

24. A transmission system terminal comprising a transmit path for a transmit signal, a receive path for a receive signal, and a hybrid circuit for coupling the transmit and receive paths to a bidirectional transmission path, wherein the transmit path includes a digital-to-analog converter for operating on samples of the transmit signal within a predetermined digital range, and a unit preceding said digital-to-analog converter arranged to scale the amplitude of transmit signal samples in accordance with said range and to provide as a part of the transmit signal an indication of said scaling for complementary scaling at a receiver and an echo canceler coupled between the transmit and the receive paths, wherein each input signal to the echo canceler from the transmit path is derived from the transmit path after said unit arranged to scale the amplitude of the transmit signal samples in accordance with said range.

25. A terminal for a transmission system using multicarrier modulation, comprising:

a transmit path including an Inverse Fast Fourier Transform (IFFT) for transforming transmit signal samples from a frequency domain to a time domain, and a digital-to-analog converter (DAC) for converting transmit signal samples in the time domain to analog signals for transmission, the DAC having a predetermined digital signal range and/or digital precision which is less than that of the IFFT;

a receive path including an analog-to-digital converter for converting a receive signal into digital signal samples and a Fast Fourier Transform (FFT) for transforming the receive signal samples from the time domain to the frequency domain, the receive path further including a subtracter for subtracting an echo signal from the receive signal;

a hybrid circuit coupled to the transmit path and the receive path for coupling transmit signals to and receive signals from a bidirectional transmission path; and an echo canceller having at least one input coupled to the transmit path and an output providing said echo signal;

wherein the transmit path further includes a limiting and/or truncation unit arranged to limit and/or truncate signal samples from the IFFT to the digital signal range and/or digital precision of the DAC, and wherein each input of the echo canceller from the transmit path is derived from the transmit path after the limiting and/or truncation unit.

26. A terminal as claimed in claim 25 wherein the echo canceller comprises a frequency-domain echo canceller and the subtracter in the receive path comprises a subtraction unit arranged to subtract a frequency-domain echo signal output of the frequency-domain echo canceller from an output of the FFT, the terminal including a further FFT arranged to transform limited and/or truncated signal samples from the output of the limiting and/or truncation unit into the frequency domain to constitute an input signal to the frequency-domain echo canceller.

27. A terminal for a transmission system using multicarrier modulation, comprising:

a transmit path including an Inverse Fast Fourier Transform (IFFT) for transforming transmit signal samples from a frequency domain to a time domain, a digital-to-analog converter (DAC) for converting transmit signal samples in the time domain to analog signals for transmission, the DAC having a predetermined digital signal range and/or digital precision which is less than that of the IFFT, and a limiting and/or truncation unit arranged to limit and/or truncate signal samples from the IFFT to the digital signal range and/or digital precision of the DAC;

a receive path including an analog-to-digital converter (ADC) for converting a receive signal into digital signal samples and a Fast Fourier Transform (FFT) for transforming the receive signal samples from the time domain to the frequency domain, the receive path further including at least one subtracter for subtracting an echo signal and an estimated echo response from the receive signal;

a hybrid circuit coupled to the transmit path and the receive path for coupling transmit signals to and receive signals from a bidirectional transmission path;

an echo canceller having at least one input coupled to the transmit path and an output providing said echo signal; and an echo response estimation unit responsive to differences between the transmit signal samples before and after the limiting and/or truncation unit for producing said estimated echo response from said differences.

28. A terminal for a transmission system using multicarrier modulation, comprising:

a transmit path including a multichannel modulating apparatus for producing a digital transmit signal; a digital-to-analog converter for converting the digital transmit signal to an analog transmit signal for transmission, the digital-to-analog converter having a predetermined digital signed range and/or digital precision which is less than that of the multichannel modulating apparatus; and a signal modification unit, arranged between the multicarrier modulating apparatus and the digital-to-analog apparatus, to modify the digital transmit signal from the multichannel modulating apparatus in accordance with the predetermined digital signal range and/or digital precision of the digital-to-analog converter;

a receive path including an analog-to-digital converter for converting an analog receive signal into a digital receive signal, a multichannel demodulating apparatus for producing multicarrier receive signals from the digital receive signal, and a subtracter for subtracting an echo signal from the receive signal;

an echo canceller having at least one input coupled to the transmit path and an output providing said echo signal to the subtracter; and a hybrid circuit coupled to the transmit path and the receive path for coupling transmit signals to and receive signals from a bidirectional transmission path.

29. A terminal as claimed in claim 28, wherein the modification unit operates to limit the digital transmit signal from the multichannel modulating apparatus in accordance with the predetermined digital signal range of the digital-to-analog converter.

30. A terminal as claimed in claim 28, wherein the modification unit operates to scale the digital transmit signal from the multichannel modulating apparatus in accordance with the predetermined digital signal range of the digital-to-analog converter.

31. A terminal as claimed in claim 28, wherein the modification unit operates to shape the digital transmit signal from the multichannel modulating apparatus so that the predetermined digital signal range of the digital-to-analog converter is not exceeded.

32. A terminal as claimed in claim 28, wherein the modification unit operates to truncate the digital transmit signal from the multichannel modulating apparatus in accordance with the predetermined digital precision of the digital-to-analog converter.

33. A terminal as claimed in claim 28, wherein the least one input from the transmit path to said echo canceller is obtained from or after signal modification unit.

34. A terminal as claimed in claim 33, wherein the subtracter further subtracts an estimated echo response from the receive signal, and wherein said terminal further includes an echo response estimation unit responsive to differences between the transmit signal before and after the limiting and/or truncation unit for producing said estimated echo response from said differences.

* * * * *

UNITED STATES PATENT AND TRADEMARK OFFICE
CERTIFICATE OF CORRECTION

PATENT NO. : 5,623,513
DATED : April 22, 1997
INVENTOR(S) : Chow et al.

It is certified that error appears in the above-indentified patent and that said Letters Patent is hereby corrected as shown below:

Column 8, line 25, "an" should be --art--.
Column 11, line 30, "career" should be --carrier--.
Column 13, line 3, "falter" should be --filter--.
Column 15, line 13, "ms" should be --as--.
Column 16, line 46, "bring" should be --being--.
Column 18, line 27, "convening" should be --converting--.
Column 18, line 61, "signed" should be --signal--.
Column 20, line 14, before "signal", insert --the--.

Signed and Sealed this

Eleventh Day of November, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,623,513

DATED : April 22, 1997

INVENTOR(S) : Chow et al.

It is certified that error appears in the above-identified patent and that said Letters Patent is hereby corrected as shown below:

Column 15, lines 26-34, the text for claim 11 should be --A method as claimed in claim 1 wherein said altering comprises scaling amplitudes of the transmit signal in accordance with a predetermined range, and said compensating comprises transmitting an indication of said scaling for complementary scaling at a receiver to which a transmit signal is transmitted--.

Signed and Sealed this

Thirtieth Day of December, 1997

Attest:

BRUCE LEHMAN

Attesting Officer  Commissioner of Patents and Trademarks